United States Patent [19]

Horie

[11] Patent Number: 4,781,134
[45] Date of Patent: Nov. 1, 1988

[54] ZIGZAG SEWING MACHINE WITH A BACK STITCH FORMING APPARATUS

[75] Inventor: Fujio Horie, Nagoya, Japan

[73] Assignee: Brother Kogyo Kabushiki Kaisha, Aichi, Japan

[21] Appl. No.: 103,659

[22] Filed: Oct. 2, 1987

[30] Foreign Application Priority Data

Oct. 2, 1986 [JP] Japan ................................ 61-235213

[51] Int. Cl.$^4$ .............................................. D05B 3/02
[52] U.S. Cl. .................................... 112/451; 112/453; 112/162; 112/317
[58] Field of Search ............... 112/451, 453, 454, 456, 112/317, 316, 162, 121.11

[56] References Cited

U.S. PATENT DOCUMENTS

| 3,977,338 | 8/1976 | Wurst et al. ............... 112/121.11 X |
| 4,250,824 | 2/1981 | Meier et al. ................... 112/162 X |
| 4,345,532 | 8/1982 | Eguchi ............................ 112/317 X |
| 4,532,876 | 8/1985 | Kongoh et al. ................ 112/317 X |
| 4,563,963 | 1/1986 | Hanyu ............................ 112/454 X |

Primary Examiner—Peter A. Nerbun
Attorney, Agent, or Firm—Barnes & Thornburg

[57] ABSTRACT

A zigzag sewing machine capable of forming a plurality of back stitches before or after forming a pattern. When a specific pattern for over-casting is selected and the needle is jogged to a position corresponding to the right end position of the selected pattern, back stitches are formed after the needle has been jogged to the left in response to the operation of a back stitch control member.

3 Claims, 4 Drawing Sheets

ZIGZAG SEWING MACHINE WITH A BACK STITCH FORMING APPARATUS

BACKGROUND OF THE INVENTION

The present invention relates to a zigzag sewing machine and, more particularly, to a zigzag sewing machine equipped with a back stitch forming system capable of forming a plurality of back stitches before or after forming a pattern.

In this specification, the above-mentioned back stitch means forms such plural stitches while feeding the work slightly forward and backward without jogging the needle, at an end of main stitches forming a pattern.

In operating a conventional zigzag sewing machine equipped with such a back stitch forming system, back stitches are formed at a position corresponding to the present position of the needle in response to the operation of a back stitch control member. Therefore, during overcasting operation, the operator operates the back stitch control member to form back stitches in the work upon arrival of the needle over the work.

However, such a manner of operation of the zigzag sewing machine is troublesome because the back stitches must be formed in the work by operating the back stitch control member upon the arrival of the needle over the work.

Furthermore, if the back stitch control member is operated incorrectly while the needle is outside the work, the needle operates for stitching operation outside the work entangling the threads.

There is disclosed a zigzag sewing machine having a back stitch forming system in U.S. Pat. Nos. 3,977,338 and 4,345,532.

SUMMARY OF THE INVENTION

Accordingly, it is a principal object of the present invention to provide a zigzag sewing machine equipped with a back stitch forming system capable of forming back stitches on a work without fail during over-casting operation. When a specific pattern is selected for overcasting operation, the back stitch forming system forms a back stitch after the needle has been jogged to a left position as viewed along the work feeding direction if the back stitch control member is operated when the needle is located at a right position with respect to the work feed direction.

The basic constitution of the present inventon for achieving the object of the invention will be described with reference to FIG. 4.

The present invention relates to a zigzag sewing machine with a back stitch forming apparatus comprising: a needle supported in a machine frame for endwise reciprocation and lateral jogging motion; pattern selecting means having a pattern selection control member, and for selecting a desired pattern among a plurality of patterns including specific patterns to perform overcasting; back stitch control member capable of being operated to form a plurality of back stitches before or after forming the pattern; memory means for storing stitch data to form a plurality of patterns and back stitches; read means for reading desired stitch data from the memory means in response to the operation of the pattern election control member and the back stitch control member; pattern discriminating means for discriminating whether the pattern selected by the pattern selecting means is a specific pattern among the specific patterns; needle position discriminating means for discriminating whether the present needle position coincides with the right end position, as viewed in the direction of feeding the work of the selected pattern; and control means for controlling the read means to read stitch data for jogging the needle to the left from the memory means in response to the operation of the back stitch control member, when a discrimination is made by the pattern discriminating means that the specific pattern is selected and a discrimination is made by the needle position discriminating means that the needle is jogged to a position corresponding to the right end position of the selected pattern; whereby back stitches are formed in a work when the specific pattern is selected.

In the zigzag sewing machine with the back stitch forming apparatus, the control means controls the read means to read stitch data for jogging the needle to the left from the memory means when the back stitch control member is operated while the present position of the needle corresponds to the right end position of the selected specific pattern and to read stitch data for forming back stitches from the memory means after the needle has been jogged to the left position.

As mentioned above, according to the present invention, when the back stitch control member is operated to form back stitches while a specific pattern for overcasting is selected and the needle is located at the right position corresponding to the right end position of the specific pattern, the back stitches are formed after the needle has been jogged to the left position. Accordingly, back stitches are formed in the work without fail and no back stitch is formed outside the work during the over-casting operation, so that back stitches are formed surely without causing the entanglement of the threads.

DESCRIPTION OF THE PREFERRED EMBODIMENT

Figure 1:
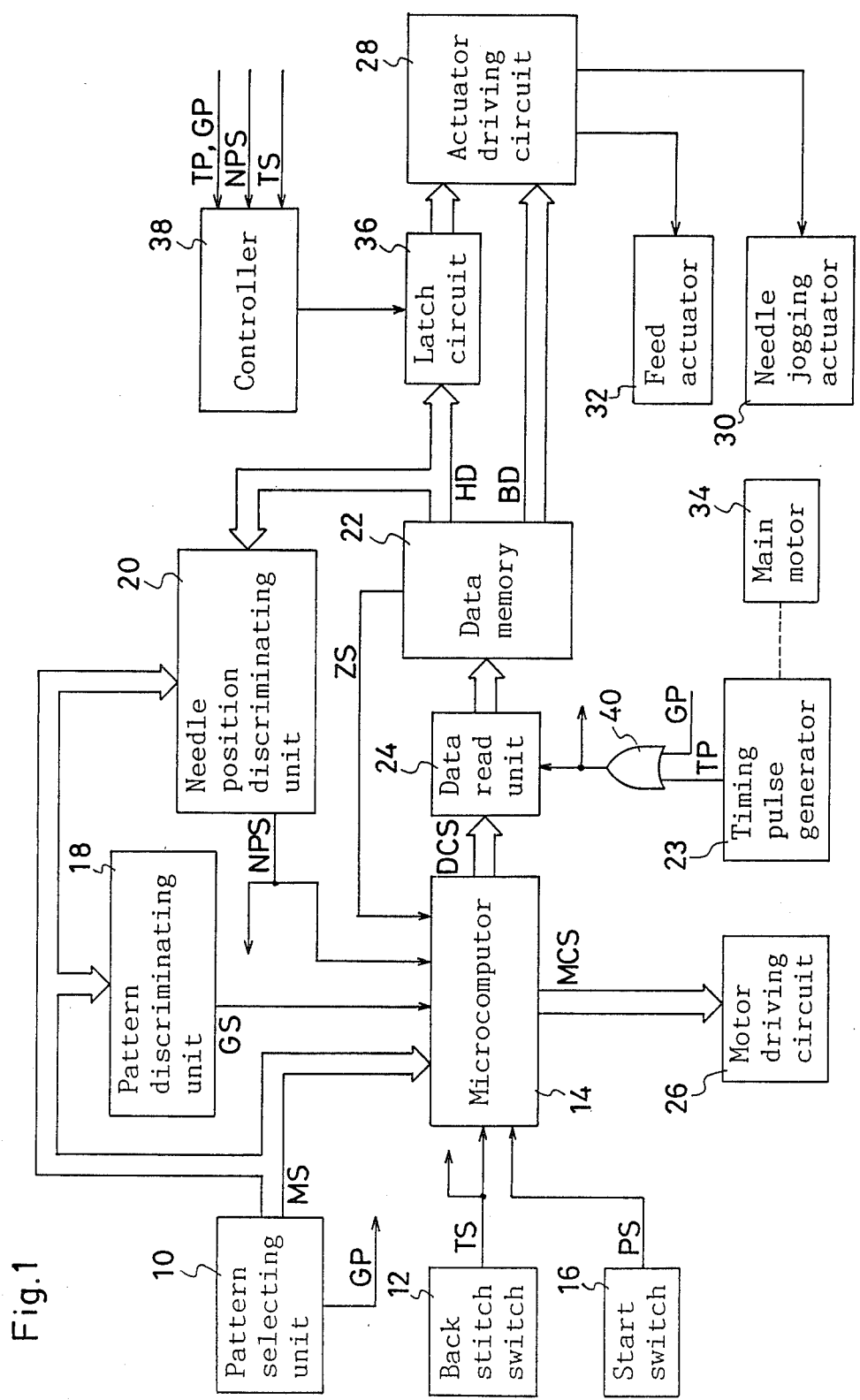
FIG. 1 is a block diagram showing the electrical construction of a zigzag sewing machine, in a preferred embodiment, according to the present invention.

Referring to FIG. 1 illustrating the electrical construction of a zigzag sewing machine, in a preferred embodiment, according to the present invention, a pattern selecting unit 10, i.e., pattern selecting means, generates a pattern code signal MS representing a pattern selected by operating a pattern selecting member, not shown, and applies a preliminary pulse GP through an OR circuit 40 to a data read unit 24 and a controller 38 when the pattern is selected. A back stitch switch 12, i.e., back stitch control member, is an automatic reset switch. When the push button of the back stitch switch 12 is pushed, a control signal TS of high level is generated and, when the push button is released, a control signal TS of low level is generated. The control signal PS is applied to a microcomputer 14. A start switch 16 is an automatic reset switch. When the push button of the start switch 16 is pressed, a control signal PS of high level is given to the microcomuter 14 and, when the push button of the same is released, a control signal PS of low level is given to the microcomputer 14.

A pattern discriminating unit 18, i.e., pattern discriminating means, decides whether the pattern code signal MS given thereto by the pattern selecting unit 10 is a specific pattern for over-casting. The pattern discriminating unit 18 gives a specific pattern signal GS of high level when the specific pattern is selected and gives a specific pattern signal GS of low level when the specific pattern is not selected to the microcomputer 14. A needle position discriminating unit 20, i.e., needle position discriminating means, decides whether the position of the needle corresponding to needle jogging data HD read from a data memory 22, i.e., memory means, corresponds to the right end position of a pattern represented by the pattern code signal MS. The needle position discriminating unit 20 gives a needle position signal NPS of high level when the needle is located at the right end position and gives a needle position signal NPS of low level when the needle is located at a position other than the right end position to the microcomputer 14 and the controller 38.

Figure 2:
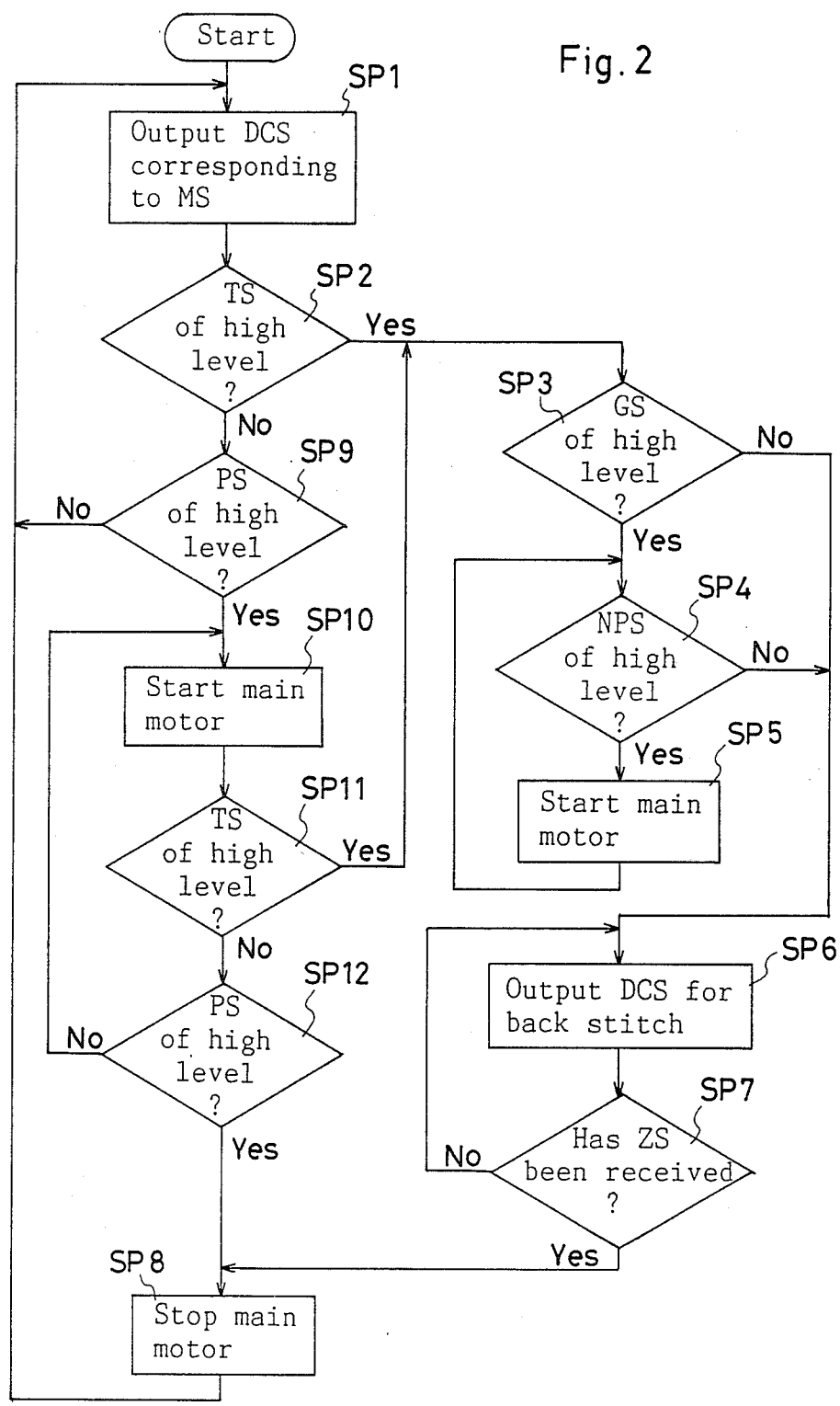
FIG. 2 is a flow chart of assistance in explaining the function of a microcomputer incorporated into the zigzag sewing machine of FIG. 1.

The microcomputer 14, i.e., control means, receives the signals, executes operation according to a control program shown in FIG. 2, and then gives a data control signal DCS and a motor control signal MCS corresponding to the input signals to the data read unit 24 and to a motor driving circuit 26, respectively.

A timing pulse generator 23 generates timing pulses TPs synchronous with the rotation of the output shaft of a main motor 34. The timing pulses TPs are given through the OR circuit 40 to the data read unit 24 and the controller 38.

The data read unit 24, i.e., read means, gives successive address signals succeeding a top address signal corresponding to a desired pattern sequentially according to the data control signal DCS every reception of the timing pulse TP or the preliminary pulse GP to the data memory 22.

The data memory 22, i.e., memory means, stores stitch data for forming stitch patterns selected respectively by the pattern selecting unit 10 and stitch data for forming back stitches. The data memory 22 feeds feed control data BD corresponding to an address signal given thereto by the data read unit 24 among the stitch data to an actuator driving circuit 28 and gives needle jogging data HD among the stitch data to the needle position discriminating unit 20 and a latch circuit 36. The data memory 22 further feeds an end signal ZS to the microcomputer 14 after the last data among the back stitch data has been provided.

Figure 3:
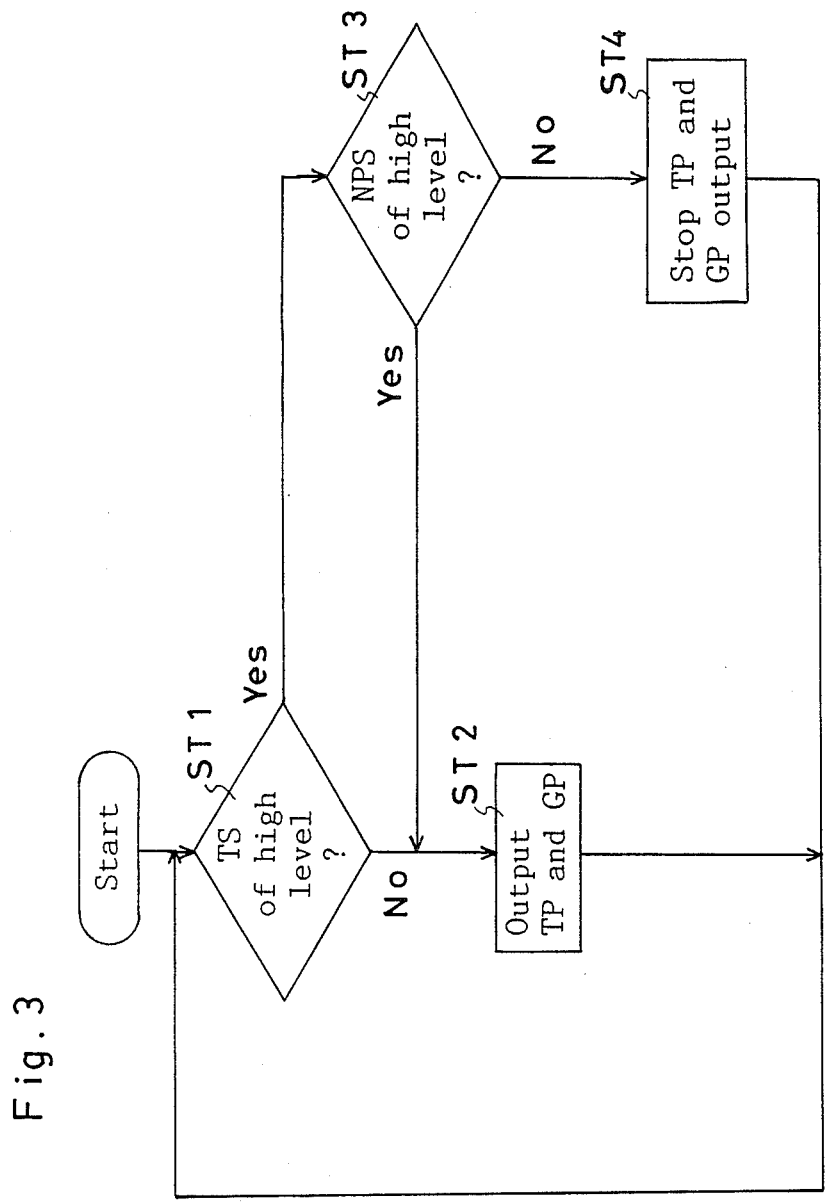
FIG. 3 is a flow chart of assistance in explaining the steps of control operation of a controller incorporated into the zigzag sewing machine of FIG. 1.
Figure 4:
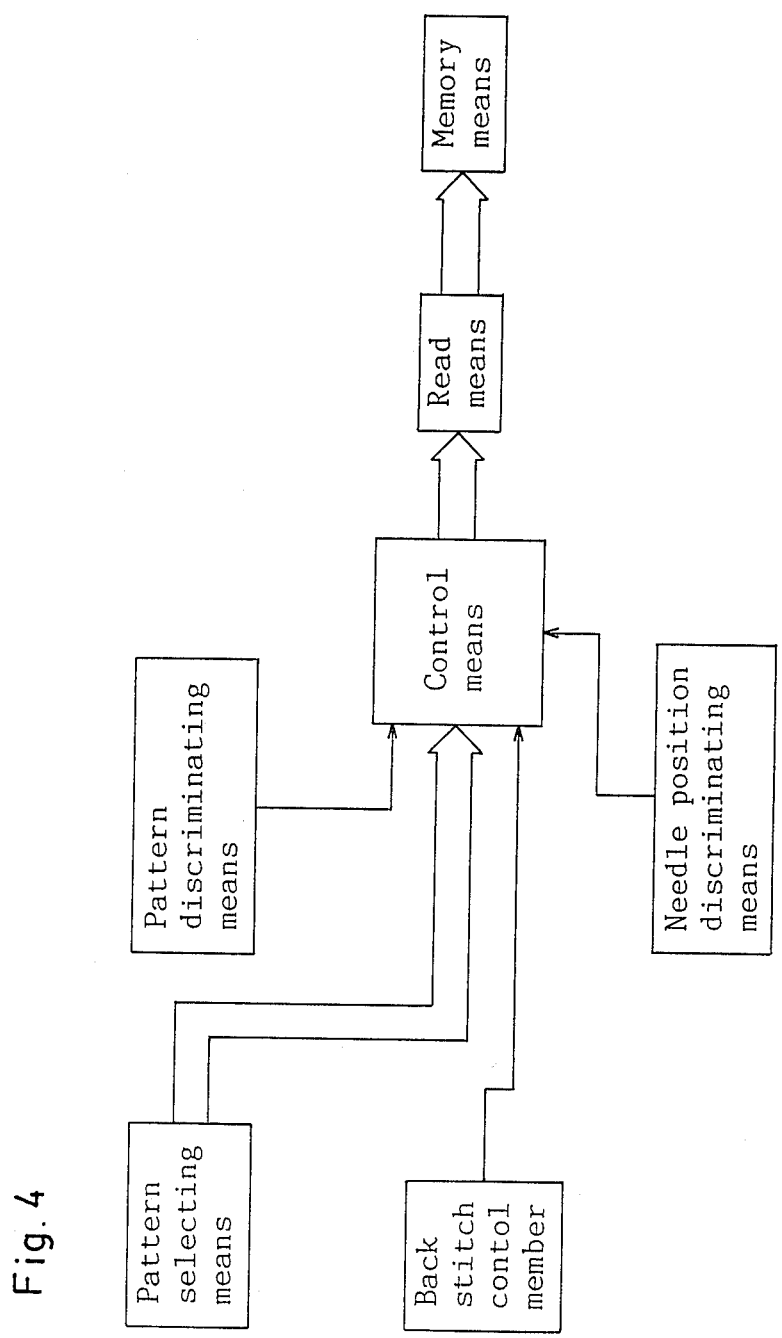
FIG. 4 is a block diagram showing the contruction of a back stitch forming system incorporaed into the zigzag sewing machine of FIG. 1.

Upon the reception of the timing pulse TP, the preliminary pulse GP, the needle position signal NPS, and the back stitch signal TS, the controller 38 operates according to a control program shown in FIG. 3 to feed the timing pulse TP and the preliminary pulse GP with a small delay to the latch circuit 36.

Upon the reception of the timing pulse TP and the preliminary pulse GP, the latch circuit 36 receives the needle jogging data HD from the data memory 22 to register the needle jogging data HD, and then feeds the needle jogging data HD to the actuator driving circuit 28.

The actuator driving circuit 28 controls a needle jogging actuator 30 and a feed actuator 32 according to the jogging data HD and the feed control data BD. The needle jogging actuator 30 sets a needle jogging position, and the feed actuator 32 set feed control position for a known feed control device.

The motor driving circuit 26 controls the main motor 34 according to the motor control signal MCS given thereto by the microcomputer 14.

The manner of operation of the zigzag sewing machine thus constructed will be described hereinafter.

First, a work is placed for over-casting operation on the bed of the zigzag sewing machine relative to the needle so that the right end position of the needle corresponds slightly outside the side edge of the work. Then, the pattern selecting member is operated to select a specific stitch pattern, for example, a zigzag stitch pattern, among specific stitch patterns for over-casting. Then, the pattern selecting unit 10 gives a pattern code signal MS representing the zigzag stitch pattern to the microcomputer 14, the pattern discriminating unit 18 and the needle position discriminating unit 20. Further, the pattern selecting unit 10 feeds the preliminary pulse GP through the OR circuit 40 to the data read unit 24 and the controller 38. Upon the reception of the pattern code signal MS representing the zigzag stitch pattern, the pattern discriminating unit 18 judges that the selected stitch pattern is a specific stitch pattern, and then feeds a specific pattern signal GS of high level to the microcomputer 14.

The microcomputer 14 gives a data control signal DCS according to the pattern code signal MS to the data read unit 24 in step SP1 of FIG. 2. Then, the data read unit 24 gives the top address signal among address signals corresponding to the zigzag stitch pattern to the data memory 22 according to the data control signal DCS and the preliminary pulse GP. Then, the data memory 22 provides the first stitch data for the first stitch of the zigzag stitch pattern. The feed control data BD of the first stitch data is given to the actuator driving circuit 28, and the needle jogging data HD of the first stitch data is given to the latch circuit 36 and the needle position discriminating unit 20. The first needle jogging data HD is data for jogging the needle to the right. Upon the reception of the needle jogging data HD and the pattern code signal MS, the needle position discriminating unit 20 feeds a needle position signal NPS of high level to the microcomputer 14 and the controller 38. The controller 38 makes a decision in step ST1 of FIG. 3 that a back stitch signal TS is of low level, and then feeds the preliminary pulse GP to the latch circuit 36 with a slight delay in step ST2. Upon the reception of the delayed preliminary pulse GP, the latch circuit 36 registers the first needle jogging data HD and feeds the first needle jogging data HD to the actuator driving circuit 28. The actuator driving circuit 28 controls the needle jogging actuator 30 and the feed actuator 32 according to the first stitch data to decide the first stitch forming position of the zigzag stitch pattern. Since the first needle jogging data HD is data for jogging the needle to the right, the needle is jogged to the right by the needle jogging actuator 30.

With the zigzag stitch pattern thus selected, the back stitch switch 12 is depressed to feed a back stitch signal TS of high level to the microcomputer 14 and the controller 38. Then, the microcomputer 14 judges that the back stitch signal TS is of high level in step SP2, judges that the specific pattern signal GS is of high level in step SP3, judges that the needle position signal NPS is of high level in step SP4, and then gives a motor control signal MCS for driving the main motor 34 to the motor driving circuit 26 in step SP5. Then, the motor driving circuit 26 drives the main motor 34 in accordance with the motor control signal MCS.

While the main motor 34 operates, the timing pulse generator 23 feeds timing pulses TPs through the OR circuit 40 to the data read unit 24 and the controller 38. Then, the data read unit 24 feeds an address signal to the data memory 22 to read the second stitch data for the second stitch upon the reception of the timing pulse TP. Upon the reception of the address signal, the data memory 22 provides the second stitch data for the second stitch to feed the feed control data BD of the second stitch data to the actuator driving circuit 28 and to feed the needle jogging data HD of the second stitch data to the latch circuit 36 and the needle position discriminating unit 20.

Upon the reception of the timing pulse TP, the controller judges that the back stitch signal TS is of high level in step ST1 of FIG. 3, judges that the needle position signal NPS is of high level in step ST3, and feeds the timing pulse TP with a slight delay to the latch circuit 36 in step ST2. Upon the reception of the delayed timing pulse TP, the latch circuit 36 registers the second needle jogging data HD instead of the first needle jogging data HD and, at the same time, feeds the second needle jogging data HD to the actuator driving circuit 28.

Then, the actuator driving circuit 28 controls the needle jogging actuator 30 and the feed actuator 32 for operation according to the second stitch data to determine a second stitch forming position of the zigzag stitch pattern. Since the second needle jogging data HD is data for jogging the needle to the left, the needle position discriminating unit 20 feeds a needle position signal NPS of low level to the microcomputer 14 and the controller 38 upon the reception of the needle jogging data HD and the pattern code signal MS. In step SP4, the microcomputer 14 judges that the needle position signal NPS is of low level, and gives a data control signal DCS for forming the back stitch to the data read unit 24 in step SP6. Then, the data read unit 24 feeds the address signals of the back stitch sequentially from the head address signal according to the data control signal DCS to the data memroy 22 in synchronism with the timing pulses TPs. Then, the data memory 22 provides stitch data for forming the back stitch. The feed control data BD of the stitch data is fed to the actuator driving circuit 28. In step ST1, the controller 38 judges that the back stitch signal TS is of high level, judges that the needle position signal NPS is of low level in step ST3, and stops feeding the timing pulses TPs to the latch circuit 36 in step ST4. Consequently, the latch circuit 36 feeds the second needle jogging data HD continually to the actuator driving circuit 28. The actuator driving circuit 28 controls the needle jogging actuator 30 and the feed actuator 32 for operation according to the stitch data so that the needle is not jogged and a back stitch is formed in the work. After providing the last data of the back stitch data, the data memory 22 gives an end signal ZS to the microcomputer 14. Upon the detection of the reception of the end signal ZS in step SP7, the microcomputer 14 feeds a motor control signal MCS designating the main motor 34 being stopped to the motor driving circuit 26 in step SP8, then the motor driving circuit 26 stops the main motor 34 upon the reception of the motor control signal MCS. Consequently, the timing pulse generator 23 stops generating timing pulses TPs and the data read unit 24 stops providing address signals. Thus, the back stitch forming operation is accomplished.

After providing the motor control signal MCS for stopping the main motor 34 in step SP8, the microcomputer 14 generates a data control signal DCS again according to a pattern code signal MS for the zigzag stitch pattern in step SP1. When the start switch 16 is depressed in this state to give a control signal PS of high level to the microcomputer 14, the microcomputer 14 judges, in step SP9, that the control signal PS is of high level, and then feeds a motor control signal MCS to the motor driving circuit 26 in step SP10 to start the main motor 34. Upon the reception of the motor control signal MCS, the motor driving circuit 26 drives the main motor 34. Then, the timing pulse generator 23 feeds timing pulses TPs through the OR circuit 40 to the data read unit 24 and the controller 38 in synchronism with the rotation of the main shaft driven by the main motor 34. The data read unit 24 operates according to the data control signal DCS to feed address signals corresponding to the zigzag stitch pattern sequentially starting from the head address signal for every reception of the timing pulse TP. Then, the data memory 22 provides stitch data for the zigzag stitch pattern according to the address signals. The feed control data BD of the stitch data is fed to the actuator driving circuit 28, and the needle jogging data HD of the stitch data is fed to the needle position discriminating unit 20 and the latch circuit 36. Then, the controller 38 judges, in step ST1, that the back stitch signal TS is of low level, and then feeds a timing pulse TP to the latch circuit 36 in step ST2. Then, the latch circuit 36 feeds the needle jogging data HD to the actuator driving circuit 28. The actuator driving circuit 28 drives the needle jogging actuator 30 and the feed actuator 32 according to the stitch data to form the zigzag stitch pattern for overcasting.

When the back stitch switch 12 is depressed to execute back stitching, a back stitch signal TS of high level is fed to the microcomputer 14. Then, the microcomputer 14 judges that the back stitch signal TS is of high level in step SP11. If the back stitch switch 12 is depressed with the needle jogged to the right, the microcomputer 14 executes steps SP3 through SP7 and the controller 38 executes steps ST1 through STS4 to form a back stitch after the needle has been jogged to the left. If the back stitch switch 12 is depressed with the needle jogged to the left, the microcomputer 14 skips step SP5 and executes steps SP6 and SP7, while the controller 38 skips step ST2 and executes steps ST1, ST3 and ST4 to form a back stitch in the work.

When the start switch 16 is depressed without depressing the back stitch switch 12 during the zigzag stitch pattern forming operation to feed a control signal PS of high level to the microcomputer 14, the microcomputer 14 judges, in step SP1, that the control signal PS is of high level, and then executes the foregoing operation in step SP8 to step the main motor 34.

The present invention is not limited to the specific embodiment described hereinbefore and many modifications therein may be made without departing from the scope thereof.

For example, the needle position discriminating unit 20 may be adapted to detect the lateral position of the needle on the basis of a detection signal provided by a needle position detector operatively interlocked with the needle to detect the actual lateral position of the needle instead of the needle jogging data HD provided by the data memroy 22.

What is claimed is:

1. A zigzag sewing machine with a back stitch forming apparatus comprising:

a needle supported in a machine frame for endwise reciprocaton and lateral jogging motion;

pattern selecting means having a pattern selection control member, and for selecting a desired pattern among a plurality of patterns including specific patterns to perform over-casting;

a back stitch control member capable of being operated to form a plurality of back stitches before or after forming the pattern;

memory means for storing stitch data to form said plurality of patterns and said back stitches;

read means for reading desired stitch data from said memory means in response to the operation of said pattern selection control member and said back stitch control member;

pattern discriminating means for discriminating whether the pattern selected by said pattern selecting means is any one of said specific patterns;

needle position discriminating means for discriminating whether the present needle position coincides with the right end position, as viewed in the direction of feeding the work, of the selected pattern; and control means for controlling said read means to read stitch data for jogging the needle to the left from said memory means in response to the operation of said back stitch control member, when a discrimination is made by said pattern discriminating means that said specific pattern is selected and a discrimination is made by said needle position discriminating means that said needle is jogged to a position corresponding to said right end position of the selected pattern;

whereby back stitches are formed in a work when any one of specific patterns is selected.

2. A zigzag sewing machine with a back stitch forming apparatus according to claim 1; wherein said needle position discriminating means discriminates according to said stitch data read by said read means.

3. A zigzag sewing machine with a back stitch forming apparatus according to claim 1; wherein said control means controls said read means so that said read means reads next stitch data in response to the operation of said back stitch control member, when a discrimination is made by said pattern discriminating means that said specific pattern is selected and a discrimination is made by said needle position discriminating means that said needle is jogged to a position corresponding to said right end position of the selected pattern.

* * * * *